Sept. 22, 1964   E. O. SCHAEFFER   3,149,723
MATERIAL SEPARATOR
Filed Sept. 19, 1961
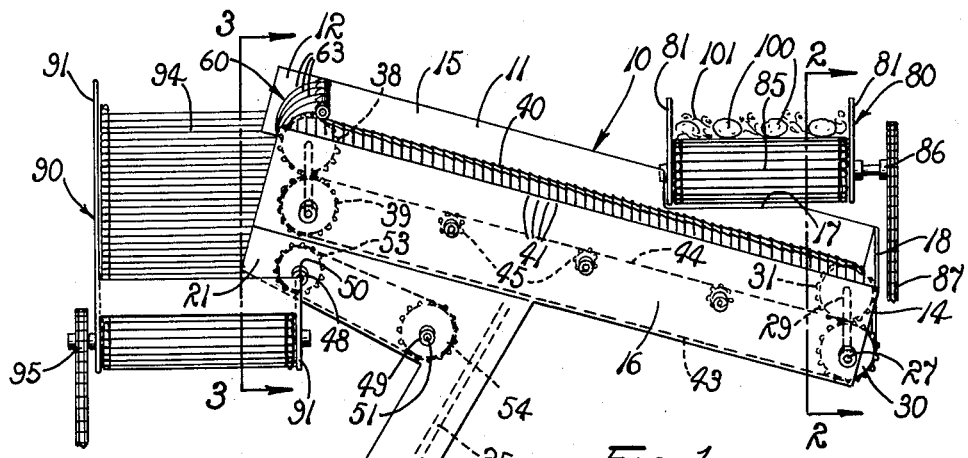
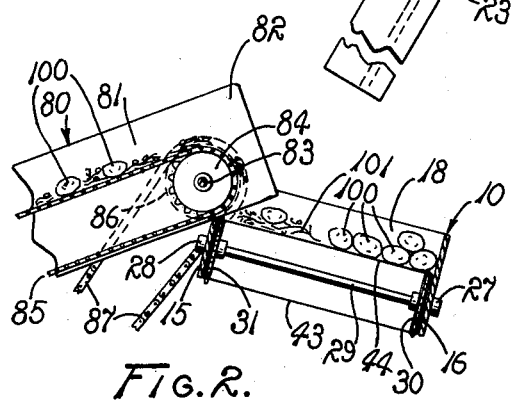
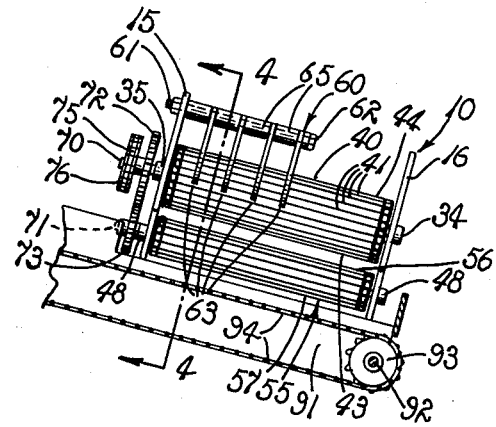
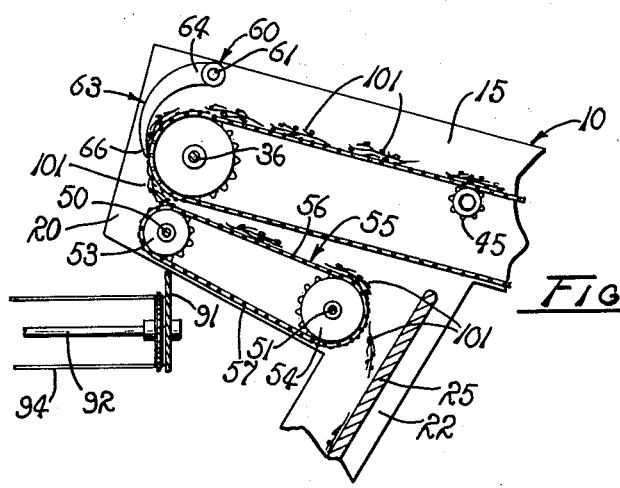
EDWIN O. SCHAEFFER
INVENTOR
HUEBNER & WORREL
ATTORNEYS

United States Patent Office 3,149,723
Patented Sept. 22, 1964

3,149,723
MATERIAL SEPARATOR
Edwin O. Schaeffer, Rte. 5, Box 508, Bakersfield, Calif.
Filed Sept. 19, 1961, Ser. No. 139,101
1 Claim. (Cl. 209—114)

The present invention relates to a material separator for use in segregating the edible portions of herbaceous plants from the stalks or vines of such plants. It particularly relates to such a separator employing a single conveyor on which the edible portions and the vines are automatically separated and ejected therefrom in individual paths of travel. As a convenient environment, the separator of the present invention is described in connection with the harvesting of potatoes; however, it is not necessarily limited to such an environment.

Conventional harvesting machines of the type employed in the digging and loading of potatoes and other herbaceous plants, include a mechanism for separating the tuber or other edible portion from the vine. Previous separating mechanisms have not been entirely effective to separate or to remove all the vines and other foreign material which usually become intermixed with the potatoes during the digging operation. This material must then be laboriously scavenged by hand, which entails additional workmen on and around the harvesting machine. The greater number of workmen required to operate the harvester increases labor costs and is still, through human error, not entirely satisfactory for removing substantially all the vines and foreign material from the potatoes.

It is therefore an object of the present invention to provide an improved completely mechanical material separator for particular use in a harvesting machine for herbaceous plants.

Another object is to provide a material separator for such machine which is capable of removing substantially all the stalks on vines and any other foreign material from the edible portion of the growing plant prior to being discharged from the machine.

Another object is to provide such a separator employing a single conveyor.

Another object is to provide a single separating conveyor capable of elevating as well as separating potatoes for easier loading into associated discharge conveyors on the machine.

Another object is to provide a single separating conveyor which is particularly effective for use in harvesting potatoes to separate and discharge potatoes and vines in individual paths of travel.

Another object is to provide a single potato and vine separating conveyor which is capable of ready adaptation to existing harvesting machine, is simply constructed, and is safe and relatively trouble free in operation.

Other objects and advantages of the present invention will become more fully apparent in the subsequent description in the specification.

In the drawings:

FIG. 1 is a side elevation of the separating conveyor of the present invention in an operating position adjacent to fragmentary portions of associated structure incorporated in a potato harvesting machine.

FIG. 2 is a somewhat enlarged fragmentary section of the conveyor taken on line 2—2 of FIG. 1.

FIG. 3 is a fragmentary section taken on line 3—3 of FIG. 1.

FIG. 4 is a further enlarged fragmentary section taken on line 4—4 of FIG. 3.

Referring more particularly to the drawing, a potato and vine separating conveyor embodying the principles of the present invention is indicated generally at 10. The conveyor provides an elongated frame 11 having opposite longitudinally spaced open upper and closed lower ends 12 and 14, respectively. The conveyor further includes an upper side plate 15 and a transversely spaced, substantially parallel lower side plate 16. The upper side plate 15 has an upwardly outwardly opening notch 17 therein for purposes soon to be described. A transversely extended end panel 18 interconnects the upper and lower side members at the lower closed end of the frame. Each of the side members 15 and 16 individually mounts a depending skirt panel 20 and 21, respectively, and an associated leg panel 22 and 23 which are joined, as by welding or the like. The legs extend angularly downwardly therefrom in substantially parallel relation to each other in individual planes common to their respective side members. A deflector panel 25 is interposed between the legs 22 and 23 in substantially rigid interconnecting relation thereto. The frame 11 is adapted to be rigidly supported in such upwardly inclined transversely tipped position by suitable supporting framework, not shown, carried on a harvesting machine. The frame is similarly supported when mounted for permanent stationary installation.

A pair of transversely aligned bearing blocks 27 and 28 are individually provided in the upper and lower side members 15 and 16 closely adjacent to the lower closed end 14 of the frame. A cross shaft 29 is rotatably journaled in the blocks to mount a pair of transversely opposite sprocket wheels 30 and 31 closely adjacent to the upper and lower side members 15 and 16. A pair of similar bearing blocks 34 and 35 are disposed in the side members closely adjacent to the upper open end 12 of the frame in longitudinally aligned relation to their respective bearing blocks 27 and 28. A cross shaft 36 is rotatably journaled in the blocks to rigidly mount a pair of sprocket wheels 37 and 38 thereon in positions closely adjacent to the upper and lower side members of the frame.

A flexible, open-link conveyor 40 having a plurality of transversely extended, longitudinally and equidistantly spaced cross bars 41, is adapted to be trained over the upper and lower sets of sprockets 37–38 and 30–31 for circuitous movement thereabout between the upper and lower side members of the frame. The conveyor also provides a lower and upper run 43 and 44, respectively, the latter of which is supported in a substantially common plane by a plurality of idler support sprockets 45 carried on shafts transversely extended between the upper and lower sides at predetermined locations intermediate the ends of the frame.

Each of the skirt panels 20 and 21 of the frame provide a pair of longitudinally spaced sets of bearing blocks 48 and 49. The blocks of each set are transversely aligned with each other. Each set individually rotatably supports cross shafts 50 and 51. The shaft 50 is downwardly spaced from the separating conveyor shaft 36 and rigidly mounts a pair of transversely opposed sprockets 53 thereon closely adjacent to the open upper end 12 of the frame. The shaft 51 rigidly mounts a pair of transversely spaced sprockets 54 in angularly downwardly extended longitudinally aligned relation to the sprockets 53. A flexible open link vine conveyor 55 is trained over the sprockets 53 and 54 for circuitous movement between the skirt panels 20 and 21. The vine conveyor 55 further includes upper and lower runs 56 and 57, which when traversing the sprockets 54, pass in closely spaced relation to the deflector panel 25.

A vine guiding device 60 is mounted adjacent to the open upper end 12 of the frame in partially closing relation thereto. The guide includes support rod 61 rigidly mounted to the upper side member 15 by a suitable threaded nut arrangement, or as by welding or the like. The rod extends transversely inwardly of the frame to terminate in a head portion 62 disposed approximately half the transverse distance between the upper and lower side members 15 and 16. A plurality of arcuate fingers 63 having upper bored ends 64, are adapted to be received upon the support rod 61 in depending relation therefrom. The fingers are equidistantly spaced from each by a plurality of spacers 65. Lower ends 66 of the fingers are in juxtaposition to the return portion of the separating conveyor 40 trained about the upper sprockets 38 and 39.

The sprocket shafts 36 and 50 adjacent to the open upper end of the frame provide outer extended portions 70 and 71 which project outwardly of the upper side member 15. The extensions 70 and 71 rigidly mount a pair of intermeshing drive gears 72 and 73, respectively which are adapted to drive their associated conveyors by way of a suitable chain or belt driven sprocket member 75 adjacent to the drive gear 72. The drive gear 75 is connected through an associated chain or belt 76 to the power take-off mechanism, not shown, normally provided on the machine. With this arrangement, the separating conveyor 40 is driven in a counterclockwise direction, as viewed in FIG. 1, with the upper run 44 thereof moving from the closed lower end 14 of the frame toward the open upper end 12. The vine conveyor 55 is thereby concurrently driven in a clockwise direction with its respective upper run 56 moving from the open upper end 12 of the frame toward the deflector panel 25 of the legs 22 and 23.

A potato and vine supply conveyor 80 is mounted on the machine by suitable framework, not shown. As best shown in FIGS. 1 and 2, the supply conveyor provides a pair of opposite side panels 81 terminating in upwardly inclined ends 82. A shaft 83 is rotatably mounted at each of its ends in the sides 81. Non-rotatably secured to the shaft is a pair of opposite sprocket wheels 84 adjacent to each of the sides 81. A flexible conveyor 85 partially shown in FIG. 2 is trained about the sprockets 84 for circuitous movement about the sprockets and a similar pair of lower sprockets, not shown. The shaft 83 is adapted to be extended outwardly of one of the sides 81 to mount a suitable drive wheel 86 driven through a belt or chain 87 connected to the power take-off in a manner similar to that provided for the drive gear 75 of the separating conveyor. The supply conveyor 80 is rested in the notch 17 of the upper side member 15 of the frame 11 in a substantially horizontal transversely related position whereby material contained thereon is dumped on to the upper side of the separating conveyor 40 closely adjacent to the closed lower end 14 of the frame.

A discharge or loading conveyor 90 is provided with a pair of opposite side members 91, a transverse shaft 92 rotatably supported therein, and a pair of sprockets 93 rigidly mounted on the shaft adjacent to the opposite sides. A conveyor belt 94 similar to the conveyors 40, 55, and 85 is trained about the sprockets 93 and similar sprockets, not shown, at the opposite end of the conveyor. The conveyor 90 is driven in a counterclockwise direction, as viewed in FIG. 3, by a drive arrangement indicated at 95 and connected to the power takeoff of the machine in a manner similar to that described above. The skirt panels 20 and 21 of the separating conveyor frame are rested on the innermost side member 91 of the discharge conveyor in a position to catch material such as potatoes being ejected from the open upper end of the separating conveyor 40. As best shown in FIGS. 1 and 3, the discharge conveyor 90 is upwardly inclined from its receiving end adjacent to the sprockets 93 to elevate and discharge such potatoes outwardly of the machine.

*Operation*

The operation of the described embodiment of the subject invention is believed to be readily apparent and is briefly summarized at this point. Although the separating conveyor has been described as being preferably adapted to a potato harvesting machine, it is readily apparent that the conveyor will have utility in other installations as well. In stationary installations, the conveyor is readily adapted to be loaded by hand or from other suitable dumping mechanisms positioned adjacent to the lower closed end 14 of the frame. Further, the upper open end may also be adapted to constrain sacks in an open position thereunder or other suitable receptacles when necessary for loading material being ejected therefrom.

With the structure of the present invention adapted in the preferred embodiment to a potato harvesting machine, potatoes and vines indicated at 100 and 101, respectively, are carried upwardly on the supply conveyor 80. The intermixed vines and potatoes are dumped closely adjacent to the upper side member 15 on to the conveyor 40 at the closed lower end 14 of the frame. Inasmuch as the potatoes of each respective vine have been physically separated from one another by a previous devining mechanism, not shown, the potatoes tumble downwardly upon the transversely inclined surface of the conveyor to a position closely adjacent to the lower side member 16 of the frame. The vines 101 being of a relatively lightweight material maintain their original position adjacent to the upper side plate 15. As the conveyor 40 is motivated to the left, as viewed in FIG. 1, toward the open upper end, the resulting vibration and flexing occurring during movement causes any potatoes remaining on the upper transverse portion of the conveyor to be disengaged therefrom to tumble toward the lower side plate 16. As the conveyor traverses the upper sprockets 38 and 39, the vines are constrained against the conveyor by the guide fingers 63. Such constraint is maintained until reaching the lower run 43 of the conveyor 40, at which time the vines are liberated to drop upon the upper run 56 of the vine conveyor 55. The vines are then carried in a reverse direction inwardly of the machine to be ejected against the deflector panel 25. The vines then slide by gravity down the deflector plate to be disposed in a neat row upon the ground over which the machine is traversing.

The potatoes 100 are concurrently ejected outwardly of the open upper end 12 of the frame between the lower side member 15 and the vine guide 60. The discharged potatoes are received upon the lower end of the discharge conveyor 90 in a substantially clean, vine-free condition to be elevated thereby and discharged outwardly of the machine for loading into suitable collecting containers. Should any vines, more tenacious than others, remain attached to their respective potatoes, these will be positively removed by the fingers 63 of the vine guide 60.

From the foregoing, it is readily apparent that the structure of the present invention effectively separates potatoes from their vines and any other foreign material. The improved separating conveyor 40 accomplishes the desired result completely automatically and requires no manual assistance to separate and to eject the potatoes and vines through discharge paths.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices and apparatus.

Having described my invention, what I claim as new and desire to secure by Letters Patent is:

In a separator adapted to segregate intermixed, lightweight, vine-like material from solid objects of greater specific gravity and having a continuous elongated separator conveyor providing upper and lower runs and opposite ends supporting the conveyor for circuitous longitudinal movement, drive means for motivating the separator conveyor in a predetermined direction whereby the upper run thereof has opposite receiving and discharge ends, said upper run of the separator conveyor being transversely inclined to provide predetermined upper and lower side edges to cause said solid objects to gravitate toward the lower side edge during conveyance by the upper run with said vine-like material remaining adjacent to said upper edge whereby said solid objects and said vine-like material are discharged in separate paths from said discharge end of the separator conveyor; the combination of a continuous discharge conveyor mounted substantially completely beneath the discharge end of the separator conveyor having upper and lower runs supported for circuitous longitudinal movement, said drive means motivating said upper run of the discharge conveyor in synchronous co-directional movement with the lower run of the separator conveyor, said upper run of the discharge conveyor providing a receiving end disposed in closely spaced relation to said lower run of the separator conveyor and coextensive with said discharge end of the separator conveyor and an opposite discharge end spaced from said lower run of the separator conveyor a greater distance than said receiving end of the discharge conveyor so that said upper run thereof downwardly diverges in its direction of movement from said lower run of the separator conveyor; and a plurality of spaced arcuate fingers mounted adjacent to the upper side edge of the separator conveyor at the discharge end thereof in the path of the vine-like material and extended downwardly about said discharge end to guide said vine-like material downwardly about said discharge end of the separator conveyor between the lower run thereof and the closely spaced upper run of the discharge conveyor so that said upper run of the discharge conveyor conveys said vine-like material away from said discharge path of the solid objects.

References Cited in the file of this patent

UNITED STATES PATENTS

| | | |
|---|---|---|
| 1,196,048 | Sutton | Aug. 29, 1916 |
| 1,315,713 | Finkle | Sept. 9, 1919 |
| 1,895,268 | Silver | Jan. 24, 1933 |
| 2,685,966 | Dauenhauer | Aug. 10, 1954 |
| 2,698,506 | Rushfeldt | Jan. 4, 1955 |

FOREIGN PATENTS

| | | |
|---|---|---|
| 948,000 | France | Jan. 24, 1949 |